(12) United States Patent
Brochhaus

(10) Patent No.: US 10,089,499 B2
(45) Date of Patent: Oct. 2, 2018

(54) METHOD AND APPARATUSES FOR AUTHENTICATING MEASUREMENT DATA RELATING TO A BATTERY

(71) Applicant: Robert Bosch GmbH, Stuttgart (DE)

(72) Inventor: Christoph Brochhaus, Aachen (DE)

(73) Assignee: Robert Bosch GmbH, Stuttgart (DE)

( * ) Notice: Subject to any disclaimer, the term of this patent is extended or adjusted under 35 U.S.C. 154(b) by 263 days.

(21) Appl. No.: 15/023,518

(22) PCT Filed: Sep. 8, 2014

(86) PCT No.: PCT/EP2014/069025
§ 371 (c)(1),
(2) Date: Mar. 21, 2016

(87) PCT Pub. No.: WO2015/043928
PCT Pub. Date: Apr. 2, 2015

(65) Prior Publication Data
US 2016/0210478 A1   Jul. 21, 2016

(30) Foreign Application Priority Data

Sep. 24, 2013   (DE) .................. 10 2013 219 100

(51) Int. Cl.
*G06F 21/64*    (2013.01)
*H04Q 9/00*    (2006.01)
(Continued)

(52) U.S. Cl.
CPC ......... *G06F 21/64* (2013.01); *G01R 31/3606* (2013.01); *G01R 31/3648* (2013.01);
(Continued)

(58) Field of Classification Search
CPC .... H02J 7/00; G06F 7/04; G06F 21/64; G06F 21/44; G06F 21/577; G01R 31/36;
(Continued)

(56) References Cited

U.S. PATENT DOCUMENTS

| | | | | |
|---|---|---|---|---|
| 7,667,429 B2 * | 2/2010 | Little | .................. | G06F 21/31 320/106 |
| 2009/0319208 A1 * | 12/2009 | Kwon | .................. | G01R 31/361 702/63 |
| 2012/0316813 A1 * | 12/2012 | Langheim | ............. | H01M 10/48 702/63 |

FOREIGN PATENT DOCUMENTS

| | | |
|---|---|---|
| DE | 10204065 | 8/2003 |
| DE | 102009030091 | 12/2010 |

(Continued)

OTHER PUBLICATIONS

International Search Report for Application No. PCT/EP2014/069035 dated Dec. 11, 2012 (English Translation, 2 pages).

(Continued)

*Primary Examiner* — Thanhnga B Truong
(74) *Attorney, Agent, or Firm* — Michael Best & Friedrich LLP

(57) ABSTRACT

A method according to the invention for authenticating measurement data relating to a battery, which comprises at least one battery module with an associated module control device (6) and a central control device (2), has the following steps: a) the module control device (6) acquires (S2) measurement data from battery units; b) the module control device (6) determines (S3) at least one additional information carrier which is set up to authenticate the measurement data; c) the measurement data and the additional information carrier are transmitted (S4) from the module control device (6) to the central control device (2); d) the central control device (2) validates (S6) the measurement data using the additional information carrier. In this case, provision is made for the additional information carrier to be determined using the measurement data and a key value defined by the module control device (6). A data structure, a computer program and a battery management system which are set up to carry out (Continued)

the method as well as a battery and a motor vehicle, the drive system of which is connected to such a battery, are also specified.

13 Claims, 3 Drawing Sheets

(51) Int. Cl.
*H01M 10/42* (2006.01)
*H01M 10/48* (2006.01)
*G01R 31/36* (2006.01)
*G06F 21/44* (2013.01)
*G06F 21/57* (2013.01)

(52) U.S. Cl.
CPC ............ *G06F 21/44* (2013.01); *G06F 21/577* (2013.01); *H01M 10/4221* (2013.01); *H01M 10/4257* (2013.01); *H01M 10/48* (2013.01); *H04Q 9/00* (2013.01); *H01M 2010/4271* (2013.01); *H01M 2010/4278* (2013.01); *H01M 2220/20* (2013.01); *H04Q 2209/10* (2013.01); *H04Q 2209/30* (2013.01)

(58) Field of Classification Search
CPC .. G01R 31/3606; G01R 31/3648; H04Q 9/00; H01M 10/4221; H01M 10/4257; H01M 10/48
USPC .......... 320/106; 726/30; 702/63, 123; 380/2, 380/247, 270, 59; 455/410, 411; 713/160, 161, 166, 186; 705/35, 413; 714/718
See application file for complete search history.

(56) References Cited

FOREIGN PATENT DOCUMENTS

DE 102011089352 8/2012
DE 102011079292 1/2013

OTHER PUBLICATIONS

Message Authentication Code, Wikipedia, Stand Jun. 2013, Retrieved from Internet on Dec. 10, 2015 <URL: http://de.wikipedia.org/w/index.php?title=Message Authentication Code&oldid=119825170[online];> (English Translation, 4 pages).

* cited by examiner

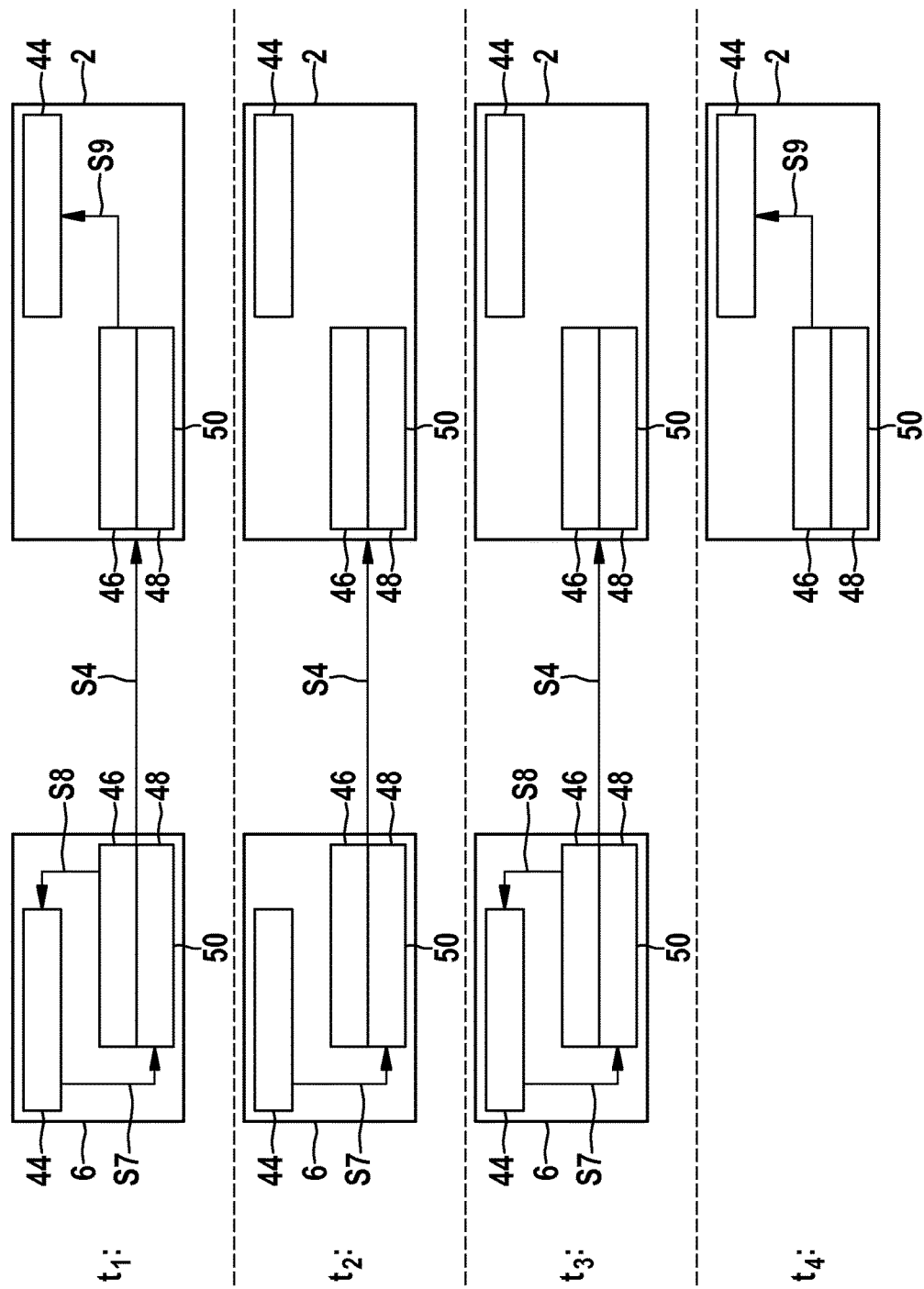

METHOD AND APPARATUSES FOR AUTHENTICATING MEASUREMENT DATA RELATING TO A BATTERY

BACKGROUND OF THE INVENTION

The invention relates to a method for authenticating measurement data relating to a battery, which comprises at least one battery module with an associated module control device and a central control device, wherein measurement data from battery units are acquired by the at least one module control device.

A data structure comprising such measurement data, a computer program and a battery management system which are set up to carry out the method are furthermore specified. In addition, a battery and motor vehicle comprising such a battery are specified.

Electronic control devices are used today in increasing numbers in the automotive field. Engine control devices and control devices for ABS or for the airbag are examples of said electronic control devices. The development of high-performance battery packs comprising associated battery management systems, i.e. control devices which are equipped with a software for monitoring the battery functionality, is currently a research focus for electrically driven vehicles. Battery management systems ensure inter alia the safe and reliable function of the battery cells and battery packs being used. Said battery management systems monitor and control currents, voltages, temperatures, insulating resistances and further variables for individual cells and/or the entire battery pack. With the aid of these variables, management functions can be implemented which increase the service life, reliability and safety of the battery system.

A method for communication between a charging station and an electric vehicle is known from the German patent application DE 10 2009 030 091 A1, said method comprising an integrity and authenticity check, wherein data packets are transmitted which are signed by means of hash codes, in particular by means of one-way functions and device keys, so that it can be determined on the receiver side whether a change in the data packets has to have taken place.

A battery management system is known from the German patent application DE 10 2011 089 352 A1 in which configuration parameters are checked, said configuration parameters comprising usage data of the battery as well as parameters which are determined by the factory tests. In this case, provision is made for a firmware to be checked and for the values in the registers to actually comprise such values which yield identical hash totals as factory programmed error detection data, e.g. check sums or hash functions. If some of the configuration parameters are found to be incorrect, measures can be taken, such as, for example, blocking the battery operation, storing a message regarding the breakdown of a memory or resetting the system.

SUMMARY OF THE INVENTION

A method according to the invention for authenticating measurement data relating to a battery comprises the following steps:

the module control device acquires measurement values from battery units;

the module control device determines at least one additional information carrier which is set up to authenticate the measurement data;

the measurement data and the at least one additional information carrier are transmitted from the module control device to the central control device;

the central control device validates the measurement data using the at least one additional information carrier, wherein the additional information carrier is determined using the measurement data and a key value defined by the module control device.

Measurement data, which are typically acquired and monitored by module control devices, comprise, for example, the temperature, the insulating resistance, the state of charge, the output current or the voltage provided. Measurement data can also comprise variables derived from the aforementioned data, for example integrated variables or variables added up on a time basis, variables that have been multiplied with one another or variables that have been aggregated in a different manner. In addition, difference values between minimum and maximum states, for example of states of charge, relative battery power outputs or the number of implementations of charging and discharging cycles can be included in the derived measurement data. Using such measurement data, battery management functions are implemented, such as, for example, the determination of an expected service life of the battery system or a state of health (SOH) of the battery.

The method can especially be used with lithium-ion batteries or with nickel-metal hydride batteries. In a preferred manner, the method can be applied to a plurality and particularly to all modules of one or a plurality of batteries which are substantially operated in the same manner.

The key value defined by the module control device is also denoted within the scope of the invention as seed or as seed key. In a particularly preferred manner, the key value defined by the module control device is ascertained using a measurement value of the variable that has been determined, for example using the temperature, the state of charge, the output current or the voltage provided or using a derived variable or one that has been aggregated in a different manner, said variable being formed as previously described. Which concrete measurement value is used should be kept secret in order to make getting around the encoding as difficult as possible for third parties.

The determined measured value is preferably a measured value which belongs to the measurement data which are transmitted with the at least one additional information carrier or prior to this from the module control device to the central control device and are or have been validated by the central control device. The determined measurement value can particularly belong to the last transmitted and validated measurement data of the module control device or to the currently transferred measurement data of the module control device which are to be validated.

The first key value defined by the module control device is also denoted as the starting value. A determined measurement value can serve as the starting value which belongs to the currently transmitted and yet to be validated measurement data of the module control device, for example a first measured cell voltage.

In a particularly preferred manner, the additional information carrier is determined by means of a one-way function $f(x,y)$ consisting of the key value defined by the module control device and the measurement data. The one-way function $f(x,y) \rightarrow z$ is preferably defined having such characteristics that the functional value $z$ thereof is simple to calculate and that a reversal of the function is very complicated and practically impossible. Examples for such one-way functions can be found in cryptography, for example hash functions, in particular SHA-1, SHA-2 or SHA-3 or as the multiplication of prime numbers.

Hash functions are suited to confirming the integrity of the data. That means that it is practically impossible to generate measurement data, which have the same hash value as provided measurement data, by means of intended modification. Without knowledge of the calculation rule of the additional information carrier, a potential attacker cannot therefore generate a plausible combination of measurement data and appropriate signature and store the same in the control device.

The hash total can also be formed using a cyclic redundancy check. In the cyclic redundancy check (CRC), a bit sequence of the measurement data is divided by a defined generator polynomial, the so-called CRC polynomial modulo 2, wherein there is a remainder. This remainder is the CRC value which is appended to the measurement data.

In the one-way function $f(x,y) \rightarrow z$, the value y is the key value defined by the module control device. By means of the value y, it is ensured that the same one-way function delivers different results in different control devices. Each module control device has its own key values and therefore uses a one-way function that is different from the others even if the measurement data is the same. The input value x is the measurement data. The value x and the value y yield the key, i.e. the information which parameterizes the cryptographic algorithm. All of the measurement data can, for example, be linked to a value by means of an XOR function, which value then together with the value y is included in the calculation of the additional information carrier. The inference back to the calculation rule is made considerably more difficult by the use of the key customized to the module control devices.

After being acquired, the measurement data are furnished either individually or in a bundled manner with the additional information carrier, which can also be referred to in this context as an item of the authenticating information or as a so-called signature. The signature, for example a 32-bit value, is stored in a data structure together with the measurement data.

The key value defined by the module control device is preferably randomly changed. A point in time can be denoted as random which is calculated by the module control device using genuine random numbers or in a pseudorandom manner, for example using the evaluation of a random noise or a random number generator. A pseudo-randomness can particularly be designed in such a way that a change occurs on average after a defined number of measurement cycles, for example after each hundredth, after each thousandth or after each ten thousandth. As an alternative hereto, the pseudo-randomness can be set up in such a way that a change occurs on average after a certain period of time or after a certain expected useful life, for example one per day on which the battery was used.

The measurement data of the individual module control devices and the additional information carriers, which are set up to authenticate the measurement data, are transmitted to the central control device. In addition, the central control device knows all previous key values defined by the module control devices. The central control device validates the measurement data by matching the transmitted additional information carriers to self-calculated, additional information carriers which are determined by means of the key values and the measurement data.

Because each module control device can change the key values, the validation of the measurement data by the central control device takes place in a preferred manner in two steps, wherein, in a first step, a validation takes place with respect to a known key value and, in the event of a failure of the validation in the first step, a validation with respect to a new key value occurs in a second step. Because the new key value belongs to the transmitted and validated measurement data of the module control device or to the measurement data currently transmitted and yet to be validated, the central control device has direct access thereto.

According to one preferred embodiment, the central control device generates an error message in the event of a failure of the validation and provides said message, for example, on the CAN bus. Provision can alternatively or additionally be made for the central control device to partially block or reduce the battery output, for example to initiate a so-called limp home mode.

According to one preferred embodiment, the method comprises the following further step:

storing the measurement data in a non-volatile memory of the central control device.

Such a non-volatile memory is, e.g., a so-called EEPROM (electrically erasable programmable read-only memory), i.e. a non-volatile, electronic memory chip, the stored information of which can be electrically erased. The storage of the measurement data in the non-volatile memory can comprise verified measurement data as well as unsuccessfully verified data, wherein the former can particularly take place for the purpose of providing measurement data for battery management functions. Measurement data provided in this way can, for example, be used to determine the average or cumulative use of the battery, for example within the scope of damage claims for determining causes. Stored, unsuccessfully verified data can, in contrast, substantiate that an attack on the system has occurred.

In a preferred manner, the verification takes place after a defined number of measurement cycles, for example after each cycle, after every tenth cycle, every hundredth cycle, every thousandth cycle or every ten thousandth cycle. The verification can alternatively occur after a defined period of time or after a defined useful life, for example on each day that the battery was used.

According to the invention, a data structure is furthermore proposed comprising measurement data of battery units and comprising at least one additional information carrier which is set up for a validation check of the measurement data. The data structure was created when carrying out one of the methods described. The data structure is, for example, read out from computer equipment for maintenance and service purposes or for authenticating the measurement data.

According to the invention, a computer program is furthermore proposed, according to which one of the methods described herein is carried out if the computer program is executed on programmable computer equipment. The computer program can, for example, relate to a module for implementing a device for providing measurement data for a battery management system and/or to a module for implementing a battery management system of a vehicle. The computer program can be stored on a machine-readable storage medium, for example on a permanent or rewriteable storage medium or in association with computer equipment, for example on a portable memory, such as a CD-ROM, DVD a USB stick or a memory card. In addition or as an alternative thereto, the computer program can be provided on a computing device, such as on a server or a cloud server, for downloading, for example via a data network, such as the internet, or a communication connection, such as a telephone line or a wireless connection.

According to the invention, a battery management system (BMS) is furthermore provided, comprising a unit for acquiring measurement data of battery units, a unit for determining an additional information carrier, which is set up to authenticate the measurement data and which is determined using measurement data and a key value defined by the module control device, units for transmitting the measurement data and the additional information carrier from a module control device to a central control device, and a unit for validating the measurement data using the additional information carrier. In a preferred manner, the battery management system comprises a non-volatile memory as well as a unit for storing the transmitted and validated measurement data in a non-volatile memory.

According to the invention, a battery, in particular a lithium-ion battery or a nickel-metal hydride battery, is furthermore provided, which comprises a battery management system and can be connected to a drive system of a motor vehicle, the battery management system as previously described being designed and/or set up to carry out the method according to the invention.

The terms "battery" and "battery unit" are used in the present description in accordance with the normal use of language for accumulator battery or, respectively accumulator battery unit. The battery preferably comprises one or a plurality of battery units, which can comprise a battery cell, a battery module, a module string or a battery pack. The battery cells are thereby preferably spatially consolidated and connected to one another using circuit technology, for example connected in series with or in parallel to modules. A plurality of modules can form so-called battery direct converters (BDC: battery direct converter), and a plurality of battery direct converters can form a battery direct inverter (BDI).

According to the invention, a motor vehicle comprising such a battery is furthermore provided, wherein the battery is connected to a drive system of the motor vehicle. In a preferred manner, the method is used with electrically driven vehicles, in which a multiplicity of battery cells is interconnected for providing the required drive voltage.

A manipulation of measurement data and/or a non-authorized replacement of battery modules can be prevented with the method according to the invention. In addition, the unauthorized use of battery modules outside of specifications by manipulating the measurement data can be detected. If measurement data do not have a correct additional information carrier, this is then an indication of a defective memory or that the measurement data has been manipulated.

Without exact knowledge of the calculation rule and the unambiguous key value of the module control device, a plausible signature of a potential attacker cannot be calculated. Moreover, the so-called reverse engineering of the signature calculation by means of a sufficient number of known measurement data-signature-combinations is made considerably more difficult by the use of the key customized to the module control devices. For the unlikely case that an attacker has decoded the safeguard of the usage information for a module, said attacker can at most falsify the usage information of this one module. All other modules remain secured as before. It is furthermore very advantageous that the one-way functions can be identically implemented on all of the module control devices because said module control devices unambiguously change the one-way function for each module control device.

The replacement of module control devices is also detected very advantageously for security reasons and for the handling of warranty claims. Upon detecting an unauthorized replacement of said module control devices, the battery management system can block the use of the entire battery pack or set the battery pack in the limp home mode.

The central battery control device and the local module control devices can be arbitrarily configured and can react arbitrarily to falsification, for example by means of memoranda in the error memory or by blocking the battery. The option of detecting memory defects is furthermore provided to the control device, and said control device can correspondingly react and no longer use the defective memory cells.

It is also particularly advantageous that the authentication can be carried out very quickly and with little complexity because only one single signature is communicated and is to be checked. The method is also characterized by a small additional data volume because a single signature can be associated with a multiplicity of measurement values. In addition, the start-up procedure of the battery management system, the so-called system boot, is not delayed because a matching of the signatures can be carried out within the scope of the cyclical measurement data communication.

BRIEF DESCRIPTION OF THE DRAWINGS

Exemplary embodiments of the invention are depicted in the drawings and are explained in detail in the following description.

In the drawings:

FIG. 4 shows an example for method steps according to the invention.

DETAILED DESCRIPTION

Figure 1:
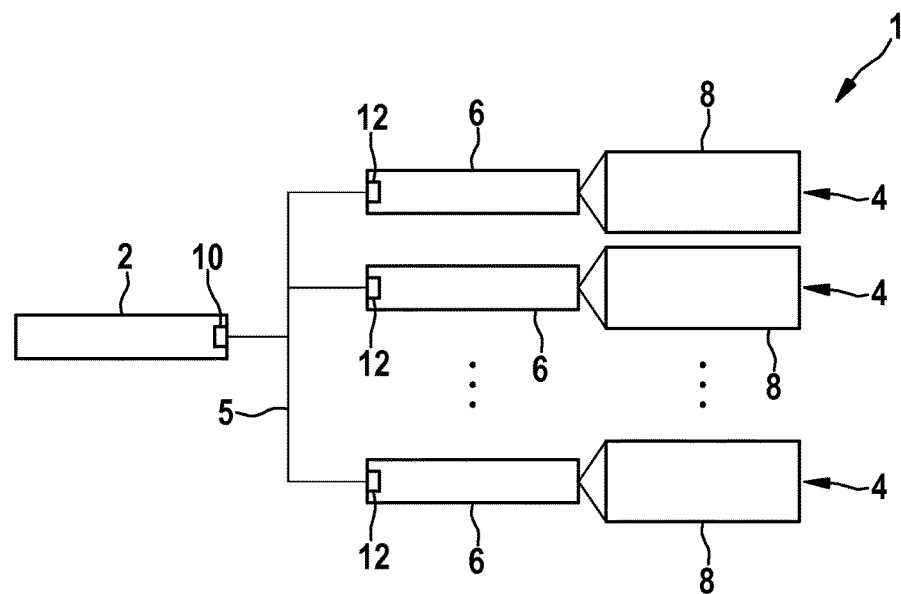
FIG. 1 shows a battery management system.

The battery management system 1 in FIG. 1 comprises a central control device 2, which can also be referred to as a BCU (battery control unit), and a number of battery modules 4, which each have their own module control devices 6, which can also be referred to as a CMC (cell module controller). Battery units 8 usually comprising a plurality of battery cells are associated with each battery module 4, said cells being connected in series and in part additionally in parallel in order to achieve the required power and energy data with the battery system. The individual battery cells are, for example, lithium-ion batteries having a voltage range of 2.8 to 4.2 volts. The communication between the central control device 2 and the module control devices 6 takes place via a communication channel 5, for example via a CAN bus, and suitable interfaces 10, 12.

Figure 2:
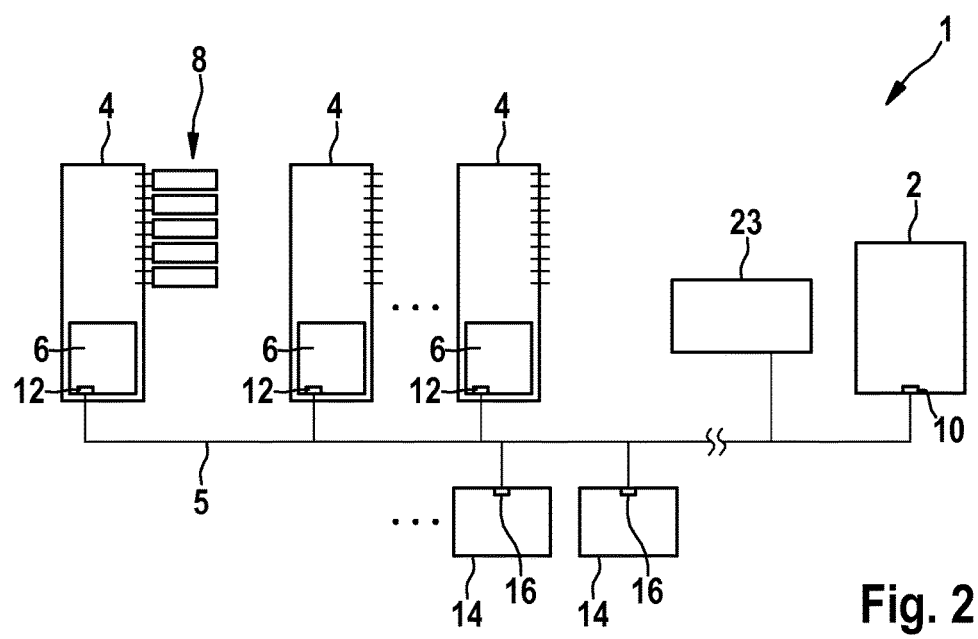
FIG. 2 shows an example of an attempt at manipulation in the communication between module control devices and a central control device.

FIG. 2 shows a further schematic depiction of the battery management system 1 from FIG. 1. The battery management system 1 comprises the central control device 2 and the battery modules 4, which each have module control devices 6. Battery units 8 comprising a plurality of battery cells are associated with each battery module 4. The communication between the central control device 2 and the module control devices 6 takes place via the communication channel 5, for example via the CAN bus, and suitable interfaces 10, 12. Sensors 14 are connected to the communication channel 5 via further interfaces 16. In FIG. 2, an attempt at manipulation by an attacker 23 in the communication between the module control devices 12 and the central control device 2 is depicted. The attacker 23 gains access to the communication channel 5 and falsifies transmission data. In so doing, the attacker 23 interrupts the communication between the central control device 2 and the module control devices 6 and answers service requests of the central control device 2 with self-created messages. These messages reproduce the valid communication with the module control devices 6. The attacker 23 can, for example, falsify measurement values in order to increase the power output of the battery. The attacker 23 could particularly specify the state of charge of the battery to be higher than it actually is. As a result, the central control device 2 allows a greater energy withdrawal from the battery and enables more power to be delivered to the vehicle. This can lead to damage to the battery and to an exhaustive discharge of the battery and can evoke conditions critical to the safety of the system, which cannot be detected by the central control device 2 on account of the falsified communication. This represents a considerable safety risk because the battery can be operated outside of the specifications thereof. Hence, the possibility of damage to the battery exists.

Figure 3:
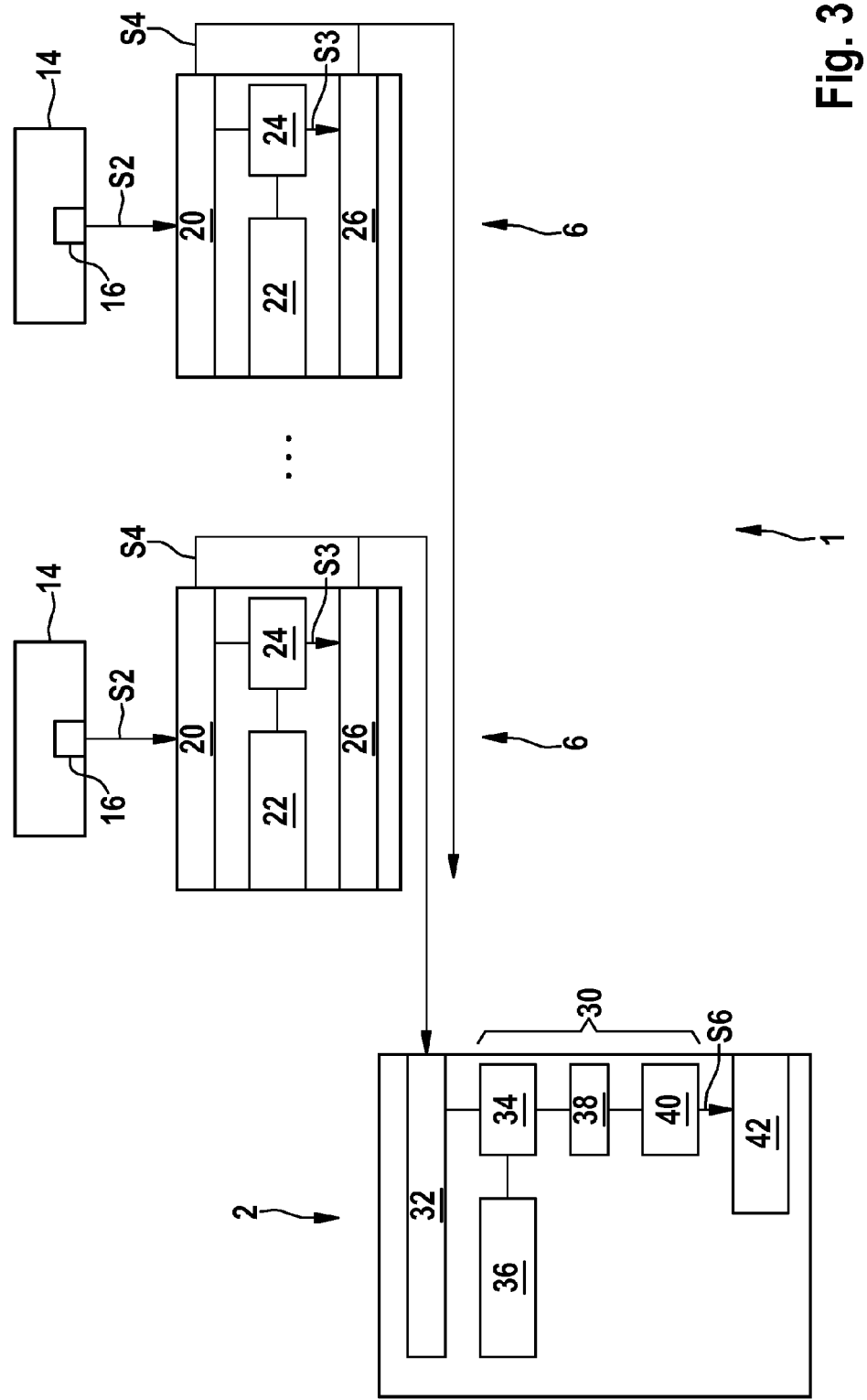
FIG. 3 shows an example for a system and method according to the invention.

FIG. 3 shows a battery management system 1 according to the invention which carries out the method according to the invention. The battery management system 1 comprises a central control device 2 and a plurality of module control devices 6. The module control devices 6 are coupled to sensors 14 which acquire measurement data, such as temperature, state of charge, current or voltage and provide the acquired data to the module control devices 6 via the interfaces 16 thereof in step S2. The module control devices 6 each comprise a unit 20 for acquiring the measurement data, said unit receiving the measurement data from the sensors 14. In each module control unit 6, the unit 20 for acquiring the measurement data is coupled to a unit 24 for determining an additional information carrier, which is set up to authenticate the measurement data. The unit 24 for determining the additional information carrier receives the measurement data from the unit 20 for acquiring the measurement data and determines a key value from a non-volatile memory 20 or using the measurement data. With the aid of these input parameters, the unit 24 calculates the signature by means of the one-way function and provides said signature to a communication unit 26 in step S3. In a further step S4, the communication unit 26 transmits the measurement data and the additional information carrier to the central control unit 2.

The central control unit 2 comprises a communication unit 32 for receiving the measurement data and the additional information carrier from the module control devices 6. The communication unit 32 for receiving the measurement data and the additional information carrier provides the received measurement data and the additional information carrier to a unit 30 for validating the measurement data using the additional information carrier. The unit 30 for validating the measurement data comprises a unit 34 for determining the key value. The key value can be determined from a non-volatile memory 36 of the central control unit 2, in which said key value is deposited. In the event that the measurement data cannot be verified by means of the key value deposited in the non-volatile memory 36 or in the event of the system start-up, the unit 34 determines the key value using a particular measurement value. The unit 30 for validating the measurement data furthermore comprises a unit 38 for calculating a signature using the measurement data and the key value and a unit 40 for comparing the transmitted signature with the calculated signature.

In a further step S6, the items of information are further processed. In the event that the measurement data have been authenticated by the unit 30 for validating the measurement data, said measurement data are further processed, for example stored or provided to a communication bus. In the event that the signatures do not match, the following scenarios can exist:

The module 6 was replaced;
a non-volatile memory of the module control device or of the central control device is defective;
errors occur during the data transmission and/or
measurement data have been falsified.

In this case, the central control device 2 carries out further tests in order to isolate the source of error, for example in order to determine whether the scenario relates to an error which can be attributed to an individual module control device 6 or whether each module control device 6 is affected. In the latter case, an error of the communication channel can be assumed. In the case of errors which indicate falsified measurement data, the central control unit 2 will block the operation of the battery pack because not all of the module control devices 6 are in the original condition. Provision can be made for the central control device 2 to allow for a restricted operation of the battery pack in order, for example, to keep the vehicle driveable to the extent that it can be brought to a repair shop for examination, which is also referred to as the so-called limp home mode.

FIG. 4 shows further steps of the method according to the invention at four different points in time $t_1$, $t_2$, $t_3$, $t_4$. At a first point in time $t_1$, the module control device 6 determines in step 8 a first key value 44 from a particular measurement value from a group of first measurement data, for example from a raw value of a first determined cell voltage. In step S7, the measurement data 46 are signed with the key value 44. The signature is present as an additional information carrier 48 together with the measurement data 46 in a common data structure 50. In step S4, the module control device 6 transmits the measurement data 46 and the additional information carrier 48 to the central control device 2. The central control device 2 determines the key value 44 from the measurement data 46 and authenticates the measurement data 46 as valid. In step S9, the central control device 2 stores the key value 44 in a non-volatile memory in a coded manner.

In step 7, the measurement data 46 of a second measurements are likewise signed with the first key value 44 at a second point in time $t_2$ of the module control device 6. In step S4, the measurement data are transmitted to the central control device 2 and authenticated as valid by the same using the stored key value 44.

At a third point in time $t_3$, the module control device autonomously changes the key value 44 to a new key value 44 at the third measurement. This change is not actively communicated to the central control device 2. The central control device 2 attempts to authenticate the measurement data with the stored key value 44, which fails.

The central control device changes at a fourth point in time $t_4$ from a first step of the validation to a second step of the validation and determines the new key value 44 from the measurement data 46 and authenticates the measurement data 46 using the new key value 44. The new key value 44 is then stored in step S9.

If an attacker reproduces the communication of the control devices 2, 6 but does not calculate the correct key values 44, the central control device 2 cannot carry out a valid authentication of the measurement data 46. In the example depicted, the second authentication will also fail in the event of falsified data. This is a clear indication of falsified data. The apparently random change of the key values, which cannot be outwardly detected, makes a reverse engineering of the signature function considerably more difficult.

The invention is not restricted to the exemplary embodiments described here nor to the aspects emphasized therein. A multiplicity of modifications, which lie within the scope of the action of a person skilled in the art, is in fact possible within the range specified by the claims.

The invention claimed is:

1. A method for authenticating measurement data (46) relating to a battery, which comprises at least one battery module (4) with an associated module control device (6) and a central control device (2), the method comprising:
   a) the module control device (6) acquires (S2) measurement data (46) from battery units (8);
   b) the module control device (6) determines (S3) at least one additional information carrier (48) which is set up to authenticate the measurement data (46);
   c) the measurement data (46) and the additional information carrier (48) are transmitted (S4) from the module control device (6) to the central control device (2);
   d) the central control device (2) validates (S6) the measurement data (46) using the additional information carrier,
      wherein the additional information carrier (48) is determined using the measurement data (46) and a key value (44) defined by the module control device (6); and
      wherein the central control device (2) implements battery management functions based on the measurement data (46) received from the module control device (6) when the central control device (2) determines the measurement data (46) received from the module control device (6) is valid.

2. The method according to claim 1, characterized in that the key value (44) defined by the module control device (6) is determined using a measured value.

3. The method according to claim 1, characterized in that the key value (44) defined by the module control device (6) is changed randomly by the module control device (6).

4. The method according to claim 1, characterized in that the central control device (2) validates (S6) the measurement data in two steps, wherein a validation with respect to a known key value (44) occurs in a first step and, in the event of a failure of the validation in the first step, a validation with respect to a new key value (44) occurs in a second step.

5. The method according to claim 4, characterized in that, in the event of a failure of the validation of the measurement data in the second step, the central control device (2) blocks the battery at least in part and an error message is generated.

6. A data structure (50) comprising measurement data (46) of battery units and at least one additional information carrier (48) which is set up to check the validity of the measurement data (46) if the data structure (50) is read by a computing device, wherein the data structure (50) is created when carrying the method according to claim 1.

7. A non-transitory computer readable medium having a program for carrying out the method according to claim 1 when the computer program is executed on a programmable computing device.

8. A battery management system (1) of a battery which comprises at least one battery module (4) with an associated module control device (6) and a central control device (2), comprising:
   a unit (20) for acquiring measurement data (46) of battery units (8);
   a unit (24) for determining an additional information carrier (48) which is set up to authenticate the measurement data (46) and which is determined using the measurement data (46) and a key value (44) defined by the module control device (6);
   units (26, 32) for transmitting the measurement data (46) and the additional information carrier (48) from the module control device (6) to the central control device (2);
   a unit (30) for validating the measurement data (46) using the additional information carrier (48)); and
   wherein the central control device (2) implements battery management functions based on the measurement data (46) received from the module control device (6) when the central control device (2) determines the measurement data (46) received from the module control device (6) is valid.

9. A battery which comprises a plurality of battery units (8) and a battery management system (1) according to claim 8 and which is connected to a drive system of a motor vehicle.

10. A motor vehicle comprising a battery according to claim 9, wherein the battery is connected to a drive system of the motor vehicle.

11. The method according to claim 4, characterized in that, in the event of a failure of the validation of the measurement data in the second step, the central control device (2) blocks the battery in part.

12. The method according to claim 4, characterized in that, in the event of a failure of the validation of the measurement data in the second step, the central control device (2) blocks the battery entirely.

13. The method according to claim 4, characterized in that, in the event of a failure of the validation of the measurement data in the second step, an error message is generated.

* * * * *